United States Patent
Takeshima et al.

(10) Patent No.: US 8,689,664 B2
(45) Date of Patent: Apr. 8, 2014

(54) BACKHOE LOADER

(75) Inventors: Hiroaki Takeshima, Komatsu (JP);
Yoshito Komatsu, Komatsu (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 13/817,097

(22) PCT Filed: Apr. 18, 2012

(86) PCT No.: PCT/JP2012/060457
§ 371 (c)(1),
(2), (4) Date: Feb. 14, 2013

(87) PCT Pub. No.: WO2013/018405
PCT Pub. Date: Feb. 7, 2013

(65) Prior Publication Data
US 2013/0139644 A1 Jun. 6, 2013

(30) Foreign Application Priority Data

Aug. 4, 2011 (JP) .................................. 2011-170980

(51) Int. Cl.
*F16H 37/06* (2006.01)
(52) U.S. Cl.
USPC ......... 74/665 GA; 74/331; 180/247; 180/248
(58) Field of Classification Search
USPC ...... 74/665 F, 665 G, 665 GA, 331; 180/247, 180/248
See application file for complete search history.

(56) References Cited

U.S. PATENT DOCUMENTS 4,549,443 A * 10/1985 White .............................. 74/360
4,792,010 A * 12/1988 Kitao et al. ................... 180/233

FOREIGN PATENT DOCUMENTS

| EP | 0 162 021 A1 | 11/1985 |
|---|---|---|
| JP | 50-66334 U | 6/1975 |
| JP | 61184135 A | 8/1986 |
| JP | 5-65642 U | 8/1993 |
| JP | 11-334401 A | 7/1999 |
| JP | 2006-062410 A | 3/2006 |
| JP | 2007-331425 A | 12/2007 |
| JP | 2008-137465 A | 6/2008 |
| JP | 2009-281512 A | 12/2009 |

OTHER PUBLICATIONS

International Search Report for PCT/JP2012/060457.
The Chinese Office Action of corresponding Chinese Application No. 201280002080.3, issued on Aug. 20, 2013.

* cited by examiner

*Primary Examiner* — David M Fenstermacher
*Assistant Examiner* — Terence Boes
(74) *Attorney, Agent, or Firm* — Global IP Counselors, LLP

(57) ABSTRACT

A backhoe loader includes a multi-axis transmission that includes: an input shaft to which power is inputted; a front output shaft coupled to a front wheel; a rear output shaft disposed in a position higher than that of the front output shaft and coupled to a rear wheel; an intermediate shaft disposed between the input shaft and the front output shaft; a first power transmission mechanism configured to transmit power from the input shaft to the intermediate shaft; and a second power transmission mechanism configured to transmit power from the intermediate shaft to the front output shaft and to transmit power from the front output shaft to the rear output shaft.

6 Claims, 11 Drawing Sheets

| SPEED STAGE | CLUTCH IN USE | FRONT OUTPUT SHAFT REDUCTION RATIO | REAR OUTPUT SHAFT REDUCTION RATIO |
|---|---|---|---|
| F 1 | F L + C 1 | 4.358 | 5.415 |
| F 2 | F L + C 2 | 2.830 | 3.516 |
| F 3 | F H + C 2 | 1.668 | 2.072 |
| F 4 | F L + C 3 | 1.024 | 1.272 |
| F 5 | F H + C 3 | 0.603 | 0.750 |
| R 1 | R + C 1 | 4.353 | 5.408 |
| R 2 | R + C 2 | 2.827 | 3.512 |
| R 3 | R + C 3 | 1.022 | 1.270 |

FIG. 3

BACKHOE LOADER

CROSS-REFERENCE TO RELATED APPLICATIONS

This application claims priority to Japanese Patent Application No. 2011-170980 filed on Aug. 4, 2011, the disclosure of which is hereby incorporated herein by reference in its entirety.

TECHNICAL FIELD

The present invention relates to a backhoe loader including a multi-axis transmission, and wherein the diameter of a rear wheel is greater than that of a front wheel.

BACKGROUND ART

As described in Japan Laid-open Patent Application Publication No. JP-A-2006-62410 and Japan Laid-open Patent Application Publication No. JP-A-2007-331425, a backhoe loader includes a loader bucket disposed forwards of a vehicle body while including a backhoe disposed rearwards of the vehicle body. Further, an operator's seat disposed in a cab is rotatable while being configured to be oriented forwards during travelling or execution of a work with the loader bucket and be oriented rearwards during execution of a work with the backhoe. Yet further, the backhoe loader has a characteristic structure that the diameter of a rear wheel is greater than that of a front wheel.

For example, a transmission as described in the above mentioned publications has been produced as a multi-axis transmission to be embedded in the backhoe loader as described above. The transmission described in Japan Laid-open Patent Application Publication No. JP-A-2009-281512 includes an input shaft, three intermediate shafts, a front output shaft and a rear output shaft. Further, each shaft is provided with a rearward travelling clutch, a forward travelling higher speed clutch, a forward travelling lower speed clutch and a speed stage switching clutch.

SUMMARY

As described above, the backhoe loader is structured that the diameter of the rear wheel is greater than that of the front wheel, and therefore, it is required to locate the front and rear output shafts in different height positions. Further, due to a reason similar to the above, it is required to set the rotation speed of the rear output shaft to be lower than that of the front output shaft by setting the front and rear output shafts to have different gear ratios. For example, in a conventional multi-axis transmission including two intermediate shafts, switching among speed stages is executed in a gear mechanism on a power transmission path from the input shaft to first and second intermediate shafts. Specifically, rotation of the input shaft is transmitted therefrom to the first intermediate shaft while being reduced in its speed, and is then transmitted from the first intermediate shaft to the second intermediate shaft while being further reduced in its speed. The second intermediate shaft also functions as a rear output shaft. Further, rotation of the second intermediate shaft (rear output shaft) is transmitted to the front output shaft while being increased in its speed.

In the conventional multi-axis transmission as described above, rotation is reduced in its speed from the input shaft to the rear output shaft by means of the gear mechanism. Therefore, a load torque in the rear output shaft is maximized among load torques in multiple shafts. Therefore, it is also required to increase the shaft diameter of the second intermediate shaft formed by a shaft that forms the rear output shaft. Further, the second intermediate shaft is provided with a plurality of hydraulic clutches for gear shifting. Due to a reason similar to the above, it is required to increase the clutch capacities of these hydraulic clutches.

As described above, in the conventional multi-axis transmission, it is required to increase the diameter of the intermediate shaft that also functions as the rear output shaft. It is also required to increase the clutch capacity of a hydraulic clutch provided for the intermediate shaft. Therefore, the weight of the transmission is increased and this obstructs fuel consumption saving.

It is an object of the present invention to achieve reduction in weight and reduction in fuel consumption especially by reducing a load torque in an intermediate shaft in a transmission for a backhoe loader.

A backhoe loader according to a first aspect of the present invention includes: a front wheel; a rear wheel having a diameter greater than a diameter of the front wheel; and a multi-axis transmission for transmitting power to the front wheel and the rear wheel. Further, the multi-axis transmission includes: an input shaft to which power is inputted; a front output shaft to be coupled to the front wheel; a rear output shaft that is coupled to the rear wheel and is disposed in a position higher than a position of the front output shaft; an intermediate shaft disposed between the input shaft and the front output shaft; a first power transmission mechanism for transmitting power from the input shaft to the intermediate shat and a second power transmission mechanism for transmitting power from the intermediate shaft to the front output shaft and for transmitting power from the front output shaft to the rear output shaft.

In the transmission, power inputted into the input shaft is transmitted to the intermediate shaft through the first power transmission mechanism. Further, power transmitted to the intermediate shaft is transmitted to the front output shaft through the second power transmission mechanism and is also transmitted to the rear output shaft from the front output shaft.

Here, power of the intermediate shaft is transmitted to the rear output shaft through the second power transmission mechanism. Therefore, the intermediate shaft and the rear output shaft can be separated away from each other. Further, through the reduction in rotation speed by the second power transmission mechanism, torque of the rear output shaft can be increased while torque of the intermediate shaft can be reduced than that of the rear output shaft. Therefore, compared to a conventional transmission, the diameter of the intermediate shaft can be further reduced and the capacity of the clutch to be attached to the intermediate shaft can be further reduced. As a result, the weight of the transmission can be reduced and fuel consumption can be reduced.

Further, it is not required to concentrically dispose the intermediate shaft and the rear output shaft. Therefore, arrangements of the respective shafts can be further flexibly designed.

A backhoe loader according to a second aspect of the present invention relates to the backhoe loader of the first aspect, and wherein the second power transmission mechanism includes: a first gear set for reducing a speed of rotation of the intermediate shaft and transmitting the speed-reduced rotation of the intermediate shaft towards the front output shaft; and a second gear set for reducing a speed of rotation of the front output shaft and transmitting the speed-reduced rotation of the front output shaft to the rear output shaft.

Here, rotation of the intermediate shaft can be transmitted to the rear output shaft with a simple structure at a large reduction ration.

A backhoe loader according to a third aspect of the present invention relates to the backhoe loader of the second aspect, and wherein the first gear set includes: an intermediate gear fixed to the intermediate shaft; and a first front output shaft gear that is rotatably supported by the front output shaft and is meshed with the intermediate gear. Further, the second gear set includes: a second front output shaft gear that is rotatably supported by the front output shaft and is fixed to the first front output shaft gear; and a rear output shaft gear that is fixed to the rear output shaft and is meshed with the second front output shaft gear. Yet further, the second power transmission mechanism further includes a driving method switching clutch that is disposed between the first and second front output shaft gears and the front output shaft and is configured to allow and prevent transmission of power between the first and second front output shaft gears and the front output shaft.

Here, the first front output gear and the second front output gear are coupled to the front output shaft by turning on (allowing transmission of power through) the driving method switching clutch. In this case, power from the intermediate shaft is also transmitted to the front output shaft through the gear set. In other words, four-wheel driving is enabled. On the other hand, when the first and second front output gears and the front output shaft are decoupled by turning off (preventing transmission of power through) the clutch, power from the intermediate shaft is transmitted to only the rear output shaft without being transmitted to the front output shaft. In other words, two-wheel driving is enabled.

A backhoe loader according to a fourth aspect of the present invention relates to the backhoe loader of any of the first to third aspects, and further includes at least a gear shifting clutch disposed on the intermediate shaft.

Here, the power transmission path is switched and gear shifting is executed by turning on or off the clutch disposed on the intermediate shaft. Further, in the transmission, the intermediate shaft and the rear output shaft are separated away from each other. Torque of the intermediate shaft can be thereby reduced and the capacity of the clutch on the intermediate shaft can be reduced. Therefore, the entire weight of the transmission can be reduced and fuel consumption can be reduced.

A backhoe loader according to a fifth aspect of the present invention relates to the backhoe loader of any of the first to fourth aspects, and further includes a forward/rearward travelling switching clutch disposed on the input shaft.

Generally in a transmission for a backhoe loader, the rotation speed of the input shaft is the highest and the rotation is transmitted to the front output shaft and the rear output shaft while the speed thereof is reduced. Therefore, torque of the input shaft is the smallest. The forward/rearward travelling switching clutch to be used frequently is herein disposed on the input shaft. Therefore, abrasion of the clutch can be inhibited.

According to the present invention as described above, in the backhoe loader, the diameter of the intermediate shaft can be reduced than that of a conventional one by reducing a load torque of the intermediate shaft, and further, the capacity of the clutch disposed on the intermediate shaft can be reduced. Therefore, the entire weight of the transmission can be reduced and fuel consumption can be reduced.

BRIEF DESCRIPTION OF THE DRAWINGS

FIG. 3 is a table representing clutches to be used and reduction ratios at respective speed stages.

DESCRIPTION OF THE EMBODIMENTS

Overall Structure

Figure 1:
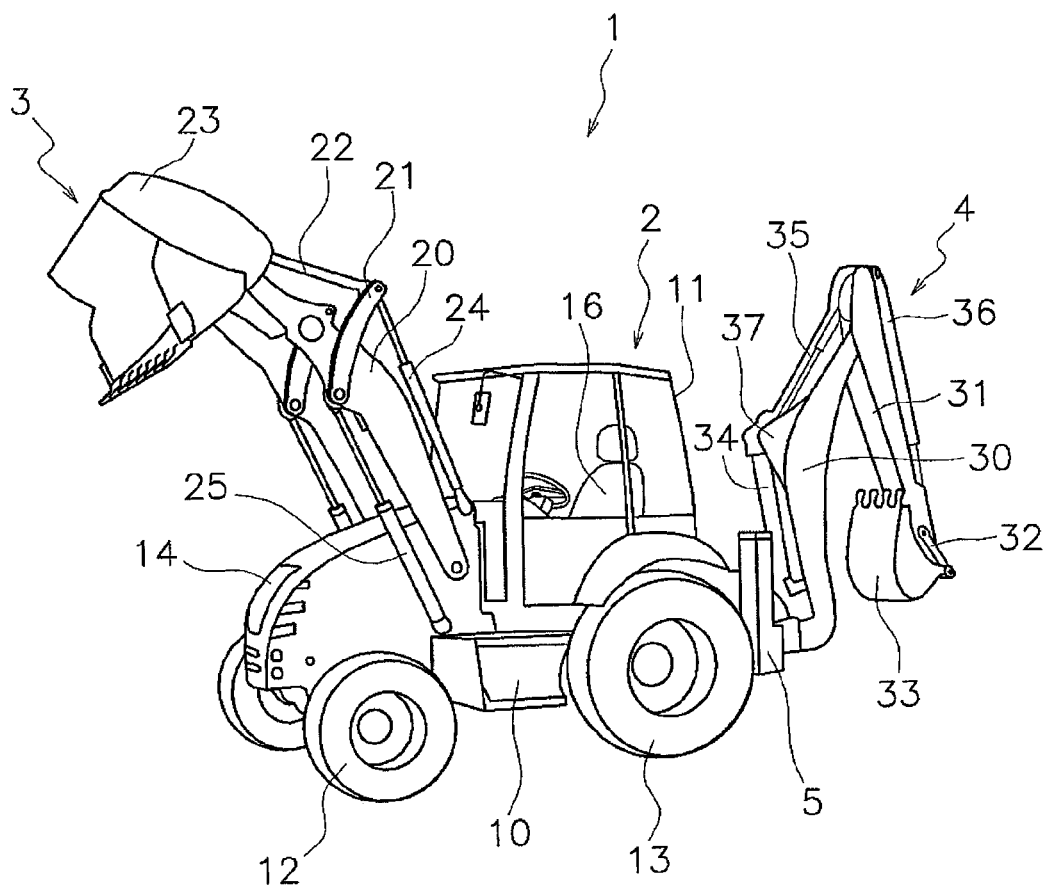
FIG. 1 is an external perspective view of a backhoe loader according to an exemplary embodiment of the present invention.

FIG. 1 illustrates an external view of a backhoe loader 1 according to an exemplary embodiment of the present invention. The backhoe loader 1 is a stand-alone work vehicle that can execute an excavation work and a loading work. The backhoe loader mainly includes a main body 2, a loader 3, a backhoe 4 and right and left stabilizers 5.

The main body 2 includes a frame 10 supporting machineries such as an engine and a transmission 6 (see FIG. 2), a cab 11 mounted on the frame 10, a pair of front wheels 12 and a pair of rear wheels 13. The backhoe loader 1 has a characteristic structure that the diameter of the rear wheel 13 is greater than that of the front wheel 12. Therefore, an axle coupled to the front wheels 12 is disposed in a position lower than that of an axle coupled to the rear wheels 13. The machineries such as the engine and the transmission are covered with an exterior cover 14. An operator's seat 16 on which an operator is seated is disposed inside the cab 11. The operator's seat 16 is rotatable between a forwardly oriented position and a backwardly oriented position. Further, a steering wheel, a variety of pedals and operating members for operating the loader 3 and the backhoe 4 are disposed inside the cab 11.

The engine is mounted in the front part of the frame 10. The engine drives the front wheels 12 and the rear wheels 13 through the transmission and the axles and drives hydraulic pumps for actuating a variety of hydraulic machines.

Figure 2:
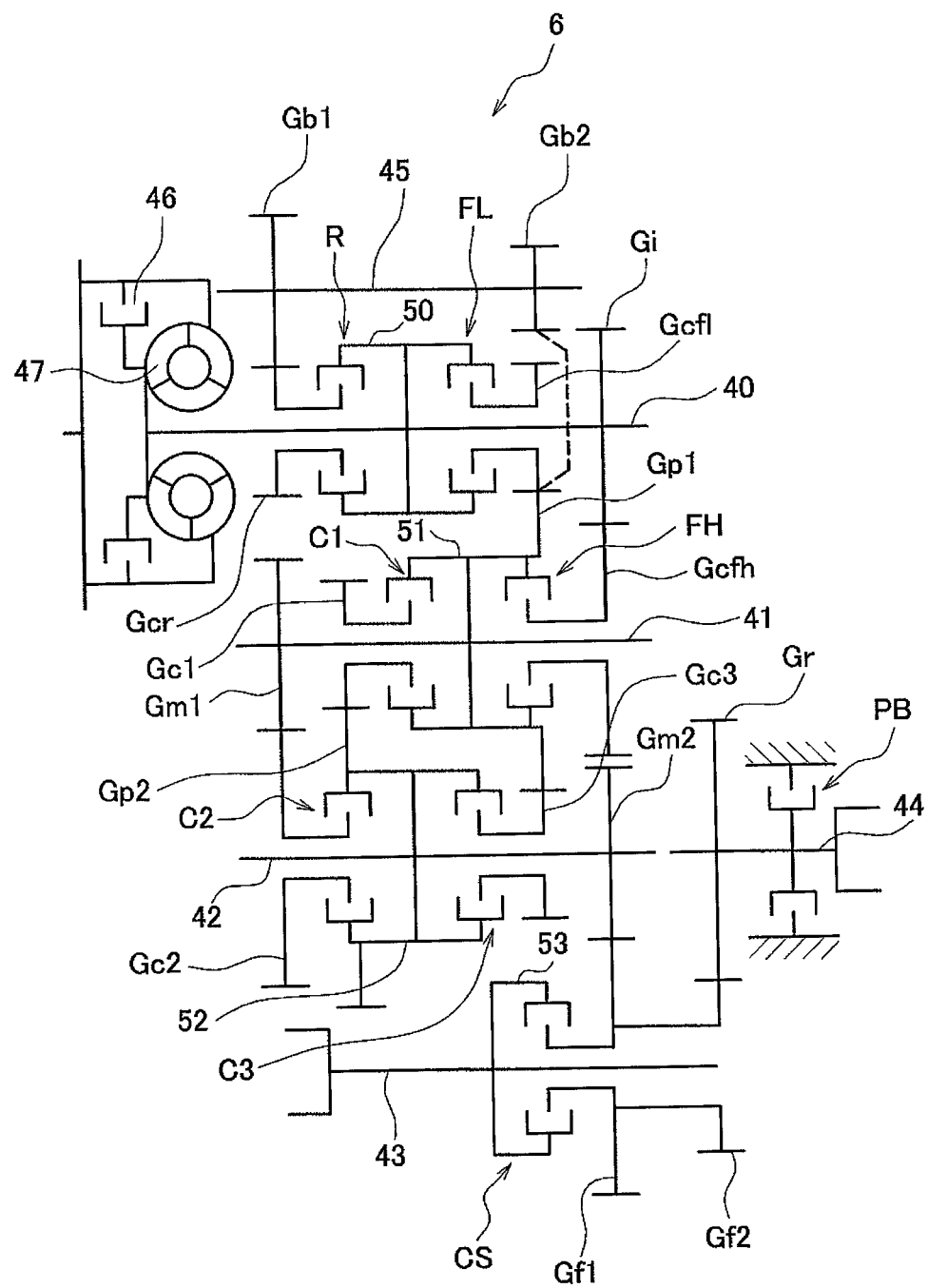
FIG. 2 is a schematic configuration diagram of a transmission of the backhoe loader.

Although explained below in detail, as illustrated in FIG. 2, the transmission 6 includes a plurality of shafts, and each of the shafts other than a reverse shaft is provided with either a hydraulic clutch or a hydraulic brake.

The loader 3 is a working unit disposed forwards of the cab 11 for executing a loading work. The loader 3 includes loader arms 20, brackets 21, links 22, a loader bucket 23, bucket cylinders 24 and arm cylinders 25.

The base ends of the loader arms 20 are rotatably supported by the frame 10, while the loader bucket 23 is rotatably attached to the tip ends of the loader aims 20. The base ends of the brackets 21 are rotatably supported by the loader arms 20, while the tip ends of rods of the bucket cylinders 24 and one ends of the links 22 are rotatably coupled to the tip ends of the brackets 21. The base ends of the bucket cylinders 24 are rotatably supported by the frame 10. Further, the tip ends of the links 22 are rotatably coupled to the bucket 23. The base ends of the arm cylinders 25 are rotatably supported by the frame 10, while the tip ends of rods of the arm cylinders 25 are rotatably coupled to longitudinally intermediate portions of the loader arms 20.

With the aforementioned structure, the loader arms 20 are upwardly rotated when the rods of the arm cylinders 25 are protruded, whereas the loader arms 20 are downwardly rotated when the rods of the arm cylinders 25 are retracted. Further, when the rods of the bucket cylinders 24 are protruded, the brackets 21 are forwardly rotated. Accordingly, the links 22 are forwardly moved and the loader bucket 23 is downwardly rotated. Contrarily, when the rods of the bucket cylinders 24 are retracted, the brackets 21 are backwardly rotated. Accordingly, the links 22 are backwardly moved and the loader bucket 23 is upwardly rotated.

The backhoe 4 is a working unit disposed rearwards of the cab 11 for executing an excavation work. The backhoe 4 includes a boom 30, an arm 31, a bucket link 32, a backhoe bucket 33, a boom cylinder 34, an arm cylinder 35 and a bucket cylinder 36. The base end of the boom 30 is supported by the frame 10 through a bracket (not illustrated in the figures) while being rotatable in the right-and-left direction. The base end of the atm 31 is rotatably coupled to the tip end of the boom 30, while the backhoe bucket 33 is rotatably coupled to the tip end of the arm 31. One end of the boom cylinder 34 is rotatably coupled to a bracket (not illustrated in the figures) fixed to the frame 10, while the other end of the boom cylinder 34 is rotatably coupled to a boom bracket 37 fixed to the boom 30. One end of the arm cylinder 35 is rotatably coupled to the boom bracket 37, while the other end of the arm cylinder 35 is rotatably coupled to the base end of the arm 31. The base end of the bucket cylinder 36 is rotatably coupled to the arm 31, while the tip end of the bucket cylinder 36 is rotatably coupled to the bucket link 32.

With the structure as described above, the boom 30 is rotated downwards when a rod of the boom cylinder 34 is protruded, whereas the boom 30 is rotated upwards when the rod of the boom cylinder 34 is retracted. Further, the arm 31 is rotated downwards when a rod of the arm cylinder 35 is protruded, whereas the arm 31 is rotated upwards when the rod of the arm cylinder 35 is retracted. Moreover, when a rod of the bucket cylinder 36 is protruded, the backhoe bucket 33 is rotated through the bucket link 32 and an opening of the backhoe bucket 33 approaches the arm 31. On the other hand, when the rod of the bucket cylinder 36 is retracted, the backhoe bucket 33 is rotated through the bucket link 32 and the opening of the backhoe bucket 33 is separated away from the arm 31.

It should be noted that the backhoe 4 includes a bracket cylinder for rotating the boom bracket coupling the boom 30 to the frame 10 in the right-and-left direction although not illustrated in the figures. One end of the bracket cylinder is rotatably coupled to the frame 10, whereas the other end of the bracket cylinder is rotatably coupled to the boom bracket. The boom bracket is rotated to one side in the right-and-left direction when a rod of the bracket cylinder is protruded, whereas the boom bracket is rotated to the other side in the right- and left direction when the rod of the bracket cylinder is retracted.

The right and left stabilizers 5 serve to prevent the backhoe loader 1 from falling down by stabilizing the posture of the backhoe loader 1 during execution of a work with the backhoe 4. The right and left stabilizers 5 are respectively disposed on the rear right part and the rear left part of the frame 10. The posture of the backhoe loader 1 can be stabilized in executing an excavation work by causing the stabilizers 5 to make contact with the ground while the stabilizers 5 are laterally stretched on the right and left sides of the backhoe loader 1 and by lifting up the rear part of the main body of the backhoe loader 1 until the rear wheels 13 are separated away from the ground.

Transmission

FIG. 2 represents a schematic configuration of the transmission 6. The transmission 6 includes an input shaft 40 to which power is inputted, a first intermediate shaft 41, a second intermediate shaft 42, a front output shaft 43, a rear output shaft 44 and a reverse shaft 45. The respective shafts 40 to 45 are disposed in parallel to each other. Further, the transmission 6 includes a torque converter 47 having a lock-up clutch 46.

Input Shaft 40

Power is inputted into the input shaft 40 from the engine either through the torque converter 47 or through the lock-up clutch 46. The input shaft 40 is disposed in the highest position amongst the shafts 40 to 45. The input shaft 40 is provided with an input shaft gear Gi, a rear travelling clutch R and a forward travelling lower speed clutch FL. The input shaft gear Gi is fixed to the input shaft 40 while being non-rotatable relatively thereto. The input side of the rearward travelling clutch R and that of the forward travelling lower speed clutch FL commonly have an input shaft clutch pack 50. The input shaft clutch pack 50 is fixed to the input shaft 40 while being non-rotatable relatively thereto. A rearward travelling clutch gear Gcr is disposed on the output side of the rearward travelling clutch R, while a forward travelling lower speed clutch gear Gcfl is disposed on the output side of the forward travelling lower speed clutch FL. The rearward travelling clutch gear Gcr and the forward travelling lower speed clutch gear Gcfl are both supported while being rotatable relatively to the input shaft 40.

First Intermediate Shaft 41

The first intermediate shaft 41 is disposed between the input shaft 40 and the front output shaft 43. The first intermediate shaft 41 is provided with a first intermediate shaft gear Gm1, a first speed clutch C1 and a forward travelling higher speed clutch FH. The first intermediate shaft gear Gm1 is fixed to the first intermediate shaft 41 while being non-rotatable relatively thereto. The input side of the first speed clutch C1 and that of the forward travelling higher speed clutch FH commonly have a first clutch pack 51. The first clutch pack 51 is fixed to the first intermediate shaft 41 while being non-rotatable relatively thereto. A first pack gear Gp1 is disposed on the outer periphery of the first clutch pack 51. The first pack gear Gp1 is meshed with the forward travelling lower speed clutch gear Gcfl. A first speed clutch gear Gc1 is disposed on the output side of the first speed clutch C1, while a forward travelling higher speed clutch gear Gcfh is disposed on the output side of the forward travelling higher speed clutch FH. The forward travelling higher speed clutch gear Gcfh is meshed with the input shaft gear Gi. The first speed clutch gear Gc1 and the forward travelling higher speed clutch gear Gcfh are both supported by the first intermediate shaft 41 while being rotatable relatively thereto.

Second Intermediate Shaft 42

The second intermediate shaft 42 is disposed between the input shaft 40 and the front output shaft 43. The second intermediate shaft 42 is provided with a second intermediate shaft gear Gm2, a second speed clutch C2 and a third speed clutch C3. The second intermediate shaft gear Gm2 is fixed to the second intermediate shaft 42 while being non-rotatable relatively thereto. The second intermediate gear Gm2 is meshed with the forward travelling higher speed clutch gear Gcfh. The input side of the second speed clutch C2 and that of the third speed clutch C3 commonly have a second clutch pack 52. The second clutch pack 52 is fixed to the second intermediate shaft 42 while being non-rotatable relatively thereto. A second pack gear Gp2 is disposed on the outer periphery of the second clutch pack 52. The second pack gear Gp2 is meshed with the first speed clutch gear Gc1. A second speed clutch gear Gc2 is disposed on the output side of the second speed clutch C2 while a third speed clutch gear Gc3 is disposed on the output side of the third speed clutch C3. The third speed clutch gear Gc3 is meshed with the first pack gear Gp1. The second speed clutch gear Gc2 and the third speed clutch gear Gc3 are both supported by the second intermediate shaft 42 while being rotatable relatively thereto.

Front Output Shaft 43

The front output shaft 43 is disposed in the lowest position among the shafts 40 to 45. Further, the front output shaft 43 is allowed to be coupled to the front wheels 12. The front output shaft 43 is provided with a driving method switching clutch CS. The driving method switching clutch CS is configured to transmit power of the second intermediate shaft 42 to the front output shaft 43 in conjunction with clutch-on, whereas being configured to block transmission of power between the second intermediate shaft 42 and the front output shaft 43 in conjunction with clutch-off. In other words, the driving method switching clutch CS is a clutch for switching between two-wheel driving and four-wheel driving. A clutch pack 53 of the driving method switching clutch CS is fixed to the front output shaft 43 while being non-rotatable relatively thereto. Further, a first front output shaft gear Gf1 and a second front output shaft gear Gf2 are disposed on the input side of the clutch CS. These front output shaft gears Gf1 and Gf2 are both rotatably supported by the front output shaft 43. Further, the both gears Gf1 and Gf2 are fixed while being non-rotatable relatively to each other. It should be noted that the both gears Gf1 and Gf2 may be formed by a single member.

Rear Output Shaft 44

The rear output shaft 44 is disposed in a position higher than that of the front output shaft 43. Further, unlike conventional transmissions, the rear output shaft 44 is formed by a shaft different from the second intermediate shaft 42 and the both shafts are separated away from each other. The rear output shaft 44 is allowed to be coupled to the rear wheels 13. The rear output shaft 44 is provided with a rear output shaft gear Gr and a parking brake PB. The rear output shaft gear Gr is fixed to the rear output shaft 44 while being non-rotatable relatively thereto. The rear output shaft gear Gr is meshed with the second front output shaft gear Gf2.

Reverse Shaft 45

The reverse shaft 45 is provided with a rearward travelling first gear Gb1 and a rearward travelling second gear Gb2 that are non-rotatable relatively thereto. The rearward travelling first gear Gb1 is meshed with the rearward travelling clutch gear Gcr. The rearward travelling second gear Gb2 is meshed with the first pack gear Gp1.

Power Transmission Mechanism

As described above, the plural gears and clutches form a first power transmission mechanism for transmitting power from the input shaft 40 to the first intermediate shaft 41 and the second intermediate shaft 42. Further, the second intermediate shaft gear Gm2, the first and second front output shaft gears Gf1 and Gf2 and the driving method switching clutch CS form a second power transmission mechanism for transmitting power from the second intermediate shaft 42 to the front output shaft 43 and for transmitting power from the front output shaft 43 to the rear output shaft 44.

It should be noted that each of the parking brake PB and the aforementioned respective clutches is formed by a hydraulic clutch (brake) that includes a plurality of friction plates and is provided with a piston to be actuated by means of hydraulic pressure.

Actions

Next, power transmission paths at the respective gear stages will be explained. FIG. 3 represents a clutch in use at each gear stage, i.e., a clutch set to be in a power transmitted state (ON), a front wheel side reduction ratio at each gear stage and a rear wheel side reduction ratio at each gear stage. It should be herein noted that a case to be explained relates to four-wheel driving that power is transmitted from the engine to the front wheels 12 and the rear wheels 13 while the driving method switching clutch CS is being constantly turned on.

Forward Travelling First Speed Stage

In the case of a forward travelling first speed stage (F1), the forward travelling lower speed clutch FL and the first speed clutch C1 are turned on while the other clutches are turned off.

Figure 4:
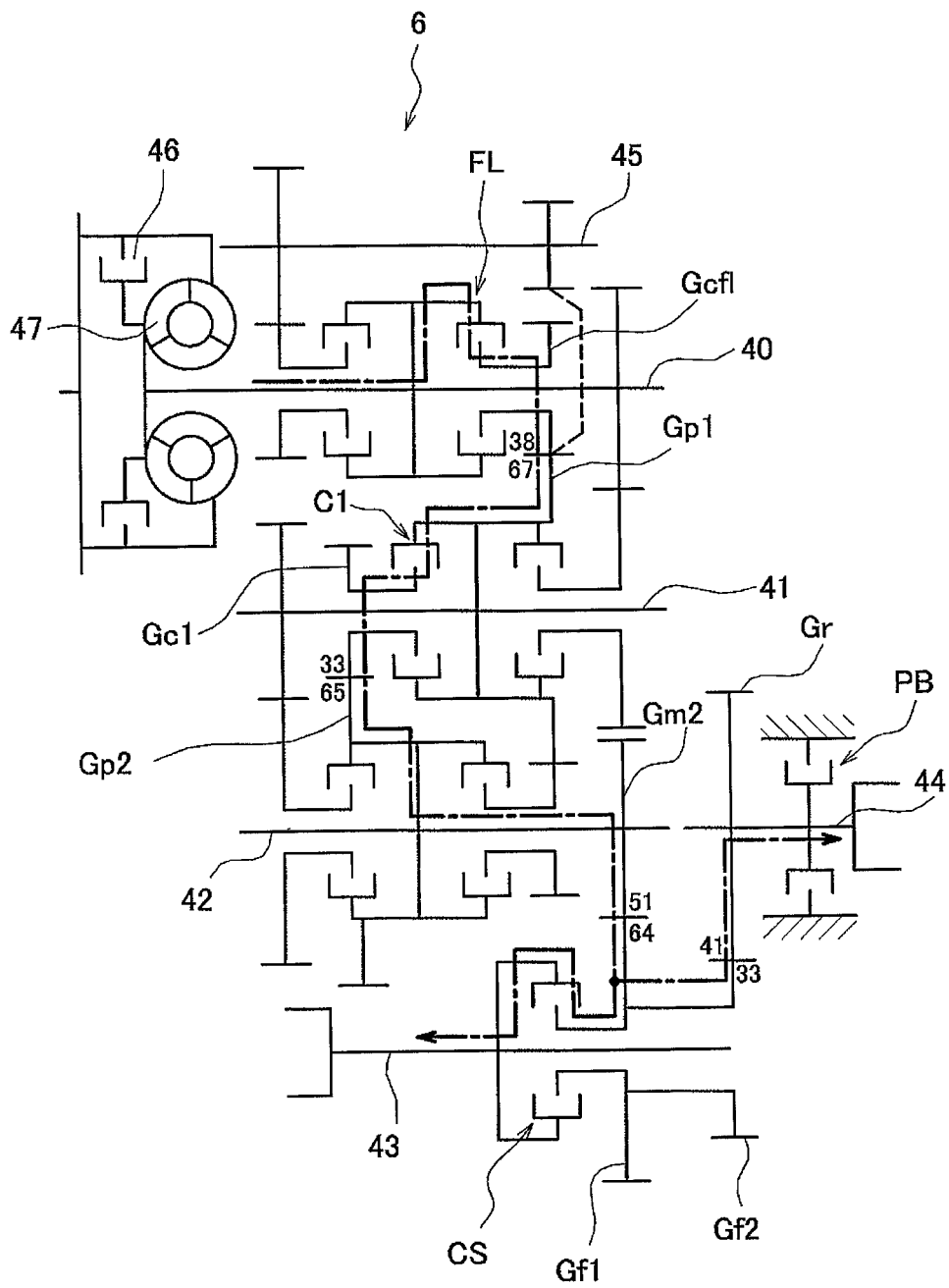
FIG. 4 is a diagram representing a power transmission path at a forward travelling first speed stage.

In this case, as depicted with an arrow of a dashed dotted line in FIG. 4, power inputted into the input shaft 40 is transmitted to the front output shaft 43 and the rear output shaft 44 through the following path.

Input shaft 40→Forward travelling lower speed clutch FL→Forward travelling lower speed clutch gear Gcfl→First pack gear Gp1→First speed clutch C1→First speed clutch gear Gc1→Second pack gear Gp2→Second intermediate shaft 42→Second intermediate shaft gear Gm2→First front output shaft gear Gf1

As described below, power is transmitted while being divided at the first front output shaft gear Gf1 into the front wheel side and the rear wheel side.

Front wheel side: →Driving method switching clutch CS→Front output shaft 43

Rear wheel side: →Second front output shaft gear Gf2→Rear output shaft gear Gr→Rear output shaft 44

Now, an exemplary gear teeth number of each gear in the power transmission path at the forward travelling first speed stage will be described as follows.

Forward travelling lower speed clutch gear Gcfl/First pack gear Gp1=38/67

First speed clutch gear Gc1/Second pack gear Gp2=33/65

Second intermediate shaft gear Gm2/First front output shaft gear Gf1=51/64

Second front output shaft gear Gf2/Rear output shaft gear Gr=33/41

In this case, a front wheel side reduction ratio is calculated as follows.

$$(67 \times 65 \times 64)/(38 \times 33 \times 51) = 4.358$$

A rear wheel side reduction ratio is calculated as follows.

$$(67\times65\times64\times41)/(38\times33\times51\times33)=5.415$$

Forward Travelling Second Speed Stage

In the case of a forward travelling second speed stage (F2), the forward travelling lower speed clutch FL and the second speed clutch C2 are turned on while the other clutches are turned off.

Figure 5:
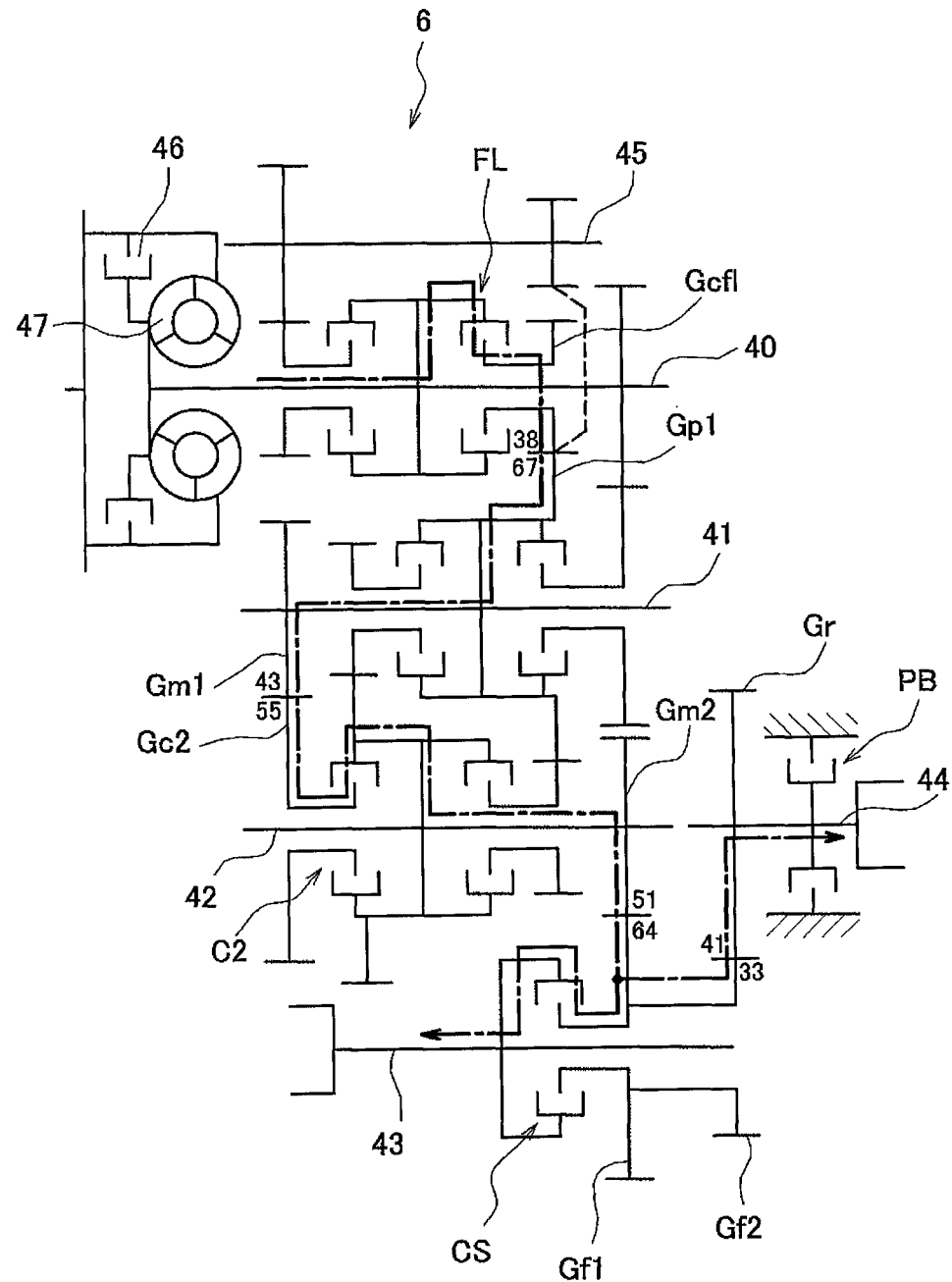
FIG. 5 is a diagram representing a power transmission path at a forward travelling second speed stage.

In this case, as depicted with an arrow of a dashed dotted line in FIG. 5, power inputted into the input shaft 40 is transmitted to the front output shaft 43 and the rear output shaft 44 through the following path.

Input shaft 40→Forward travelling lower speed clutch FL→Forward travelling lower speed clutch gear Gcfl→First pack gear Gp1→First intermediate shaft 41→First intermediate shaft gear Gm1→Second speed clutch gear Gc2→Second speed clutch C2→Second intermediate shaft 42→Second intermediate shaft gear Gm2→First front output shaft gear Gf1

As described below, power is transmitted while being divided at the first front output shaft gear Gf1 into the front wheel side and the rear wheel side.

Front wheel side: →Driving method switching clutch CS→Front output shaft 43
Rear wheel side: →Second front output shaft gear Gf2→Rear output shaft gear Gr→Rear output shaft 44

Now, an exemplary gear teeth number of each gear in the power transmission path at the forward travelling second speed stage will be described as follows.

Forward travelling lower speed clutch gear Gcfl/First pack gear Gp1=38/67
First intermediate gear Gm1/Second speed clutch gear Gc2=43/55
Second intermediate shaft gear Gm2/First front output shaft gear Gf1=51/64
Second front output shaft gear Gf2/Rear output shaft gear Gr=33/41

In this case, the front wheel side reduction ratio is calculated as follows.

$$(67\times55\times64)/(38\times43\times51)=2.830$$

The rear wheel side reduction ratio is calculated as follows.

$$(67\times55\times64\times41)/(38\times43\times51\times33)=3.516$$

Forward Travelling Third Speed Stage

In the case of a forward travelling third speed stage (F3), the forward travelling higher speed clutch FH and the second speed clutch C2 are turned on while the other clutches are turned off.

Figure 6:
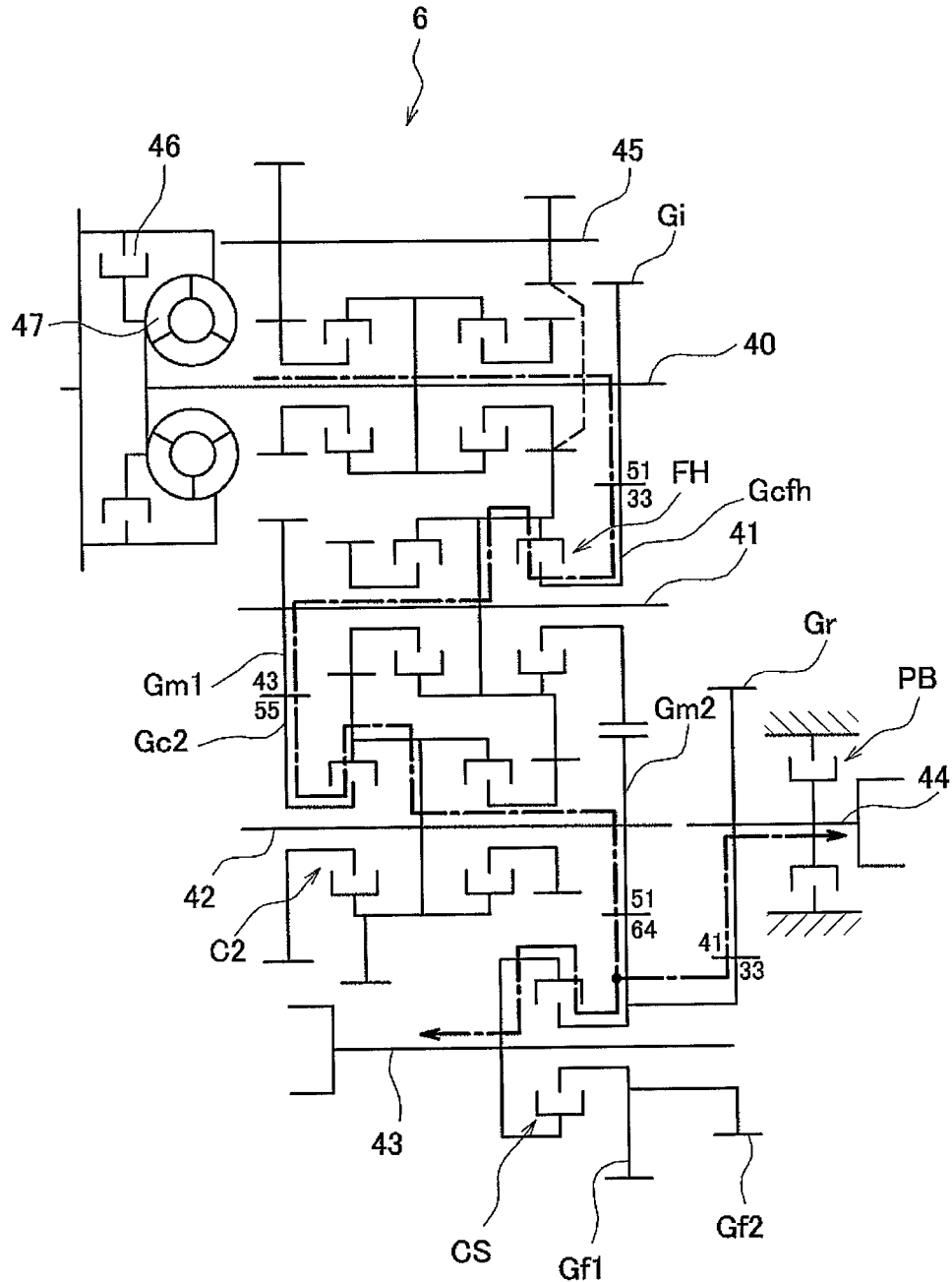
FIG. 6 is a diagram representing a power transmission path at a forward travelling third speed stage.

In this case, as depicted with an arrow of a dashed dotted line in FIG. 6, power inputted into the input shaft 40 is transmitted to the front output shaft 43 and the rear output shaft 44 through the following path.

Input shaft 40→Input shaft gear Gi→Forward travelling higher speed clutch gear Gcth→Forward travelling higher speed clutch FH→First intermediate shaft 41→First intermediate shaft gear Gm1→Second speed clutch gear Gc2→Second speed clutch C2→Second intermediate shaft 42→Second intermediate shaft gear Gm2→First front output shaft gear Gf1

As described below, power is transmitted while being divided at the first front output shaft gear Gf1 into the front wheel side and the rear wheel side.

Front wheel side: →Driving method switching clutch CS→Front output shaft 43
Rear wheel side: →Second front output shaft gear Gf2→Rear output shaft gear Gr→Rear output shaft 44

Now, an exemplary gear teeth number of each gear in the power transmission path at the forward travelling third speed stage will be described as follows.

Input shaft gear Gi/Forward travelling higher speed clutch gear Gcth=51/53
First intermediate gear Gm1/Second speed clutch gear Gc2=43/55
Second intermediate shaft gear Gm2/First front output shaft gear Gf1=51/64
Second front output shaft gear Gf2/Rear output shaft gear Gr=33/41

In this case, the front wheel side reduction ratio is calculated as follows.

$$(53\times55\times64)/(51\times43\times51)=1.668$$

The rear wheel side reduction ratio is calculated as follows.

$$(53\times55\times64\times41)/(51\times43\times51\times33)=2.072$$

Forward Travelling Fourth Speed Stage

In the case of a forward travelling fourth speed stage (F4), the forward travelling lower speed clutch FL and the third speed clutch C3 are turned on while the other clutches are turned off.

Figure 7:
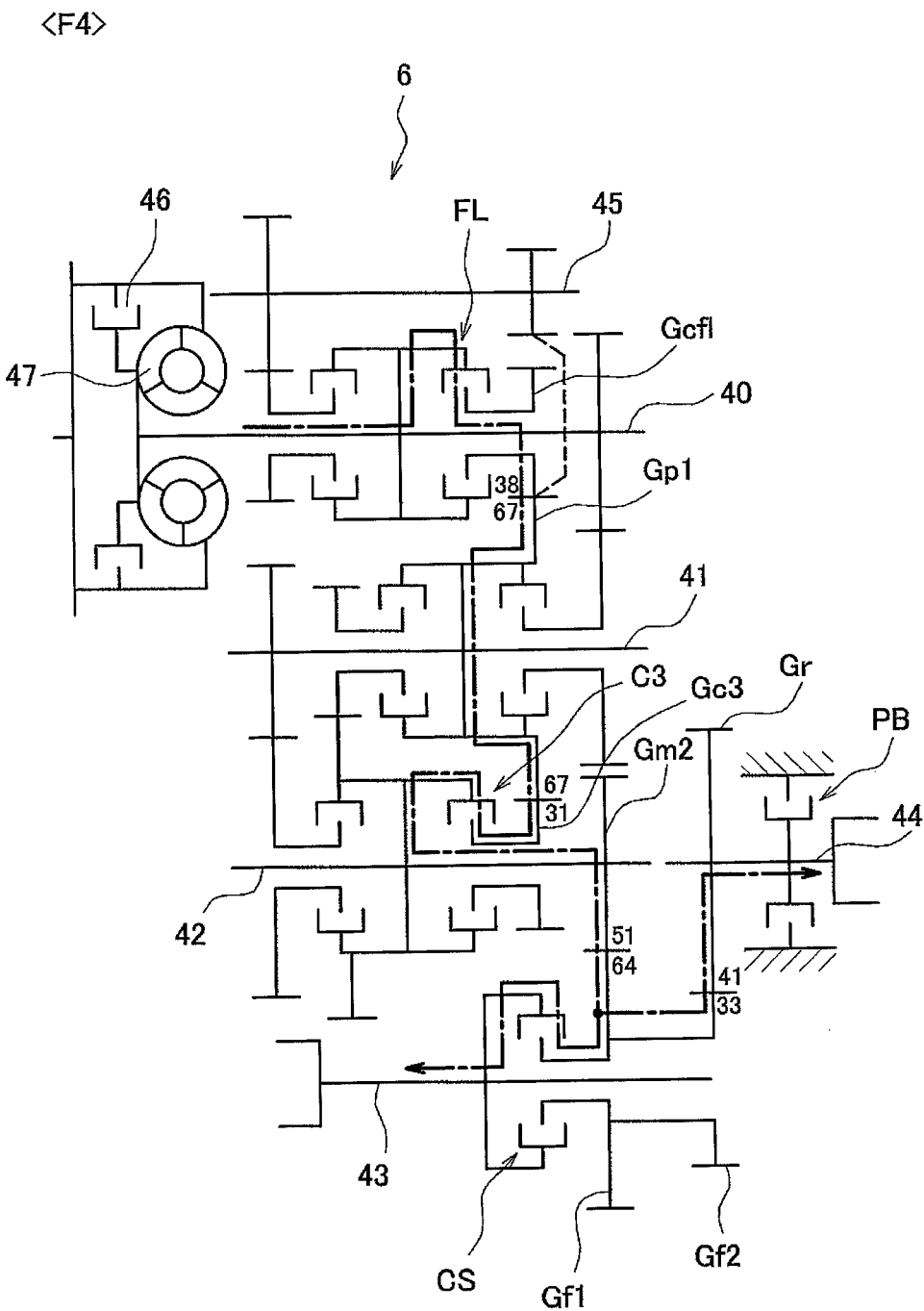
FIG. 7 is a diagram representing a power transmission path at a forward travelling fourth speed stage.

In this case, as depicted with an arrow of a dashed dotted line in FIG. 7, power inputted into the input shaft 40 is transmitted to the front output shaft 43 and the rear output shaft 44 through the following path.

Input shaft 40→Forward travelling lower speed clutch FL→Forward travelling lower speed clutch gear Gcfl→First pack gear Gp1→Third speed clutch gear Gc3→Third speed clutch C3→Second intermediate shaft 42→Second intermediate shaft gear Gm2→First front output shaft gear Gf1

As described below, power is transmitted while being divided at the first front output shaft gear Gf1 into the front wheel side and the rear wheel side.

Front wheel side: →Driving method switching clutch CS→Front output shaft 43
Rear wheel side: →Second front output shaft gear Gf2→Rear output shaft gear Gr→Rear output shaft 44

Now, an exemplary gear teeth number of each gear in the power transmission path at the forward travelling fourth speed stage will be described as follows.

Forward travelling lower speed clutch gear Gcfl/First pack gear Gp1=38/67
First pack gear Gp1/Third speed clutch gear Gc3=67/31
Second intermediate shaft gear Gm2/First front output shaft gear Gf1=51/64
Second front output shaft gear Gf2/Rear output shaft gear Gr=33/41

In this case, the front wheel side reduction ratio is calculated as follows.

$$(67\times31\times64)/(38\times67\times51)=1.024$$

The rear wheel side reduction ratio is calculated as follows.

$$(67\times31\times64\times41)/(38\times67\times51\times33)=1.272$$

Forward Travelling Fifth Speed Stage

In the case of a forward travelling fifth speed stage (F5), the forward travelling higher speed clutch FH and the third speed clutch C3 are turned on while the other clutches are turned off.

Figure 8:
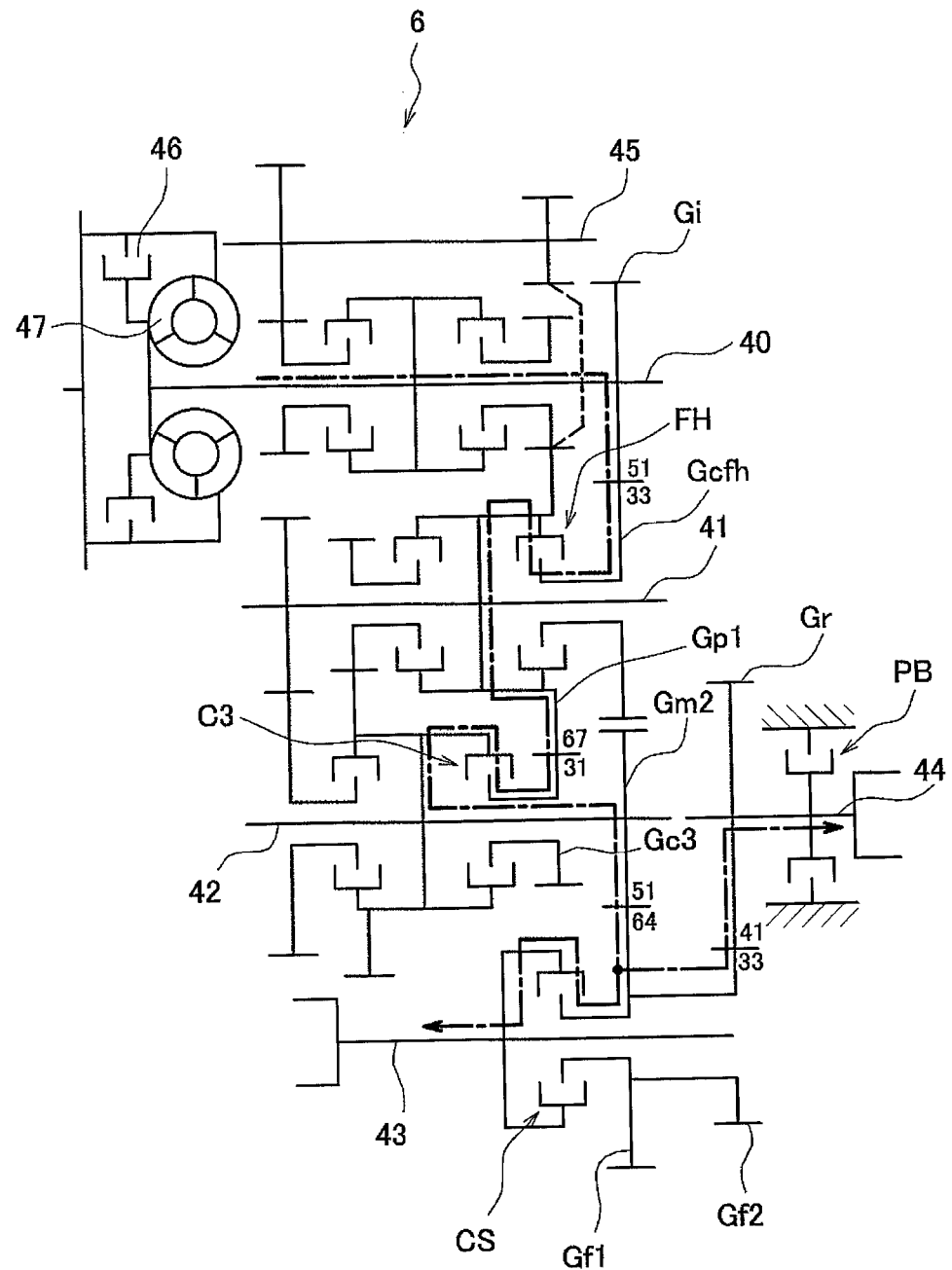
FIG. 8 is a diagram representing a power transmission path at a forward travelling fifth speed stage.

In this case, as depicted with an arrow of a dashed dotted line in FIG. 8, power inputted into the input shaft 40 is transmitted to the front output shaft 43 and the rear output shaft 44 through the following path.

Input shaft 40→Input shaft gear Gi→Forward travelling higher speed clutch gear Gcfh→Forward travelling higher speed clutch FH→First intermediate shaft 41→First pack gear Gp1→Third speed clutch gear Gc3→Third speed clutch C3→Second intermediate shaft 42→Second intermediate shaft gear Gm2→First front output shaft gear Gf1

As described below, power is transmitted while being divided at the first front output shaft gear Gf1 into the front wheel side and the rear wheel side.

Front wheel side: →Driving method switching clutch CS→Front output shaft 43
    Rear wheel side: Second front output shaft gear Gf2→Rear output shaft gear Gr→Rear output shaft 44

Now, an exemplary gear teeth number of each gear in the power transmission path at the forward travelling fifth speed stage will be described as follows.

Input shaft gear Gi/Forward travelling higher speed clutch gear Gcth=51/53

First pack gear Gp1/Third speed clutch gear Gc3=67/31

Second intermediate shaft gear Gm2/First front output shaft gear Gf1=51/64

Second front output shaft gear Gf2/Rear output shaft gear Gr=31/41

In this case, the front wheel side reduction ratio is calculated as follows.

$$(53\times31\times64)/(51\times67\times51)=0.603$$

The rear wheel side reduction ratio is calculated as follows.

$$(53\times31\times64\times41)/(51\times67\times51\times33)=0.750$$

Rearward Travelling First Speed Stage

In the case of a rearward travelling first speed stage (R1), the rearward travelling clutch R and the first speed clutch C1 are turned on while the other clutches are turned off.

Figure 9:
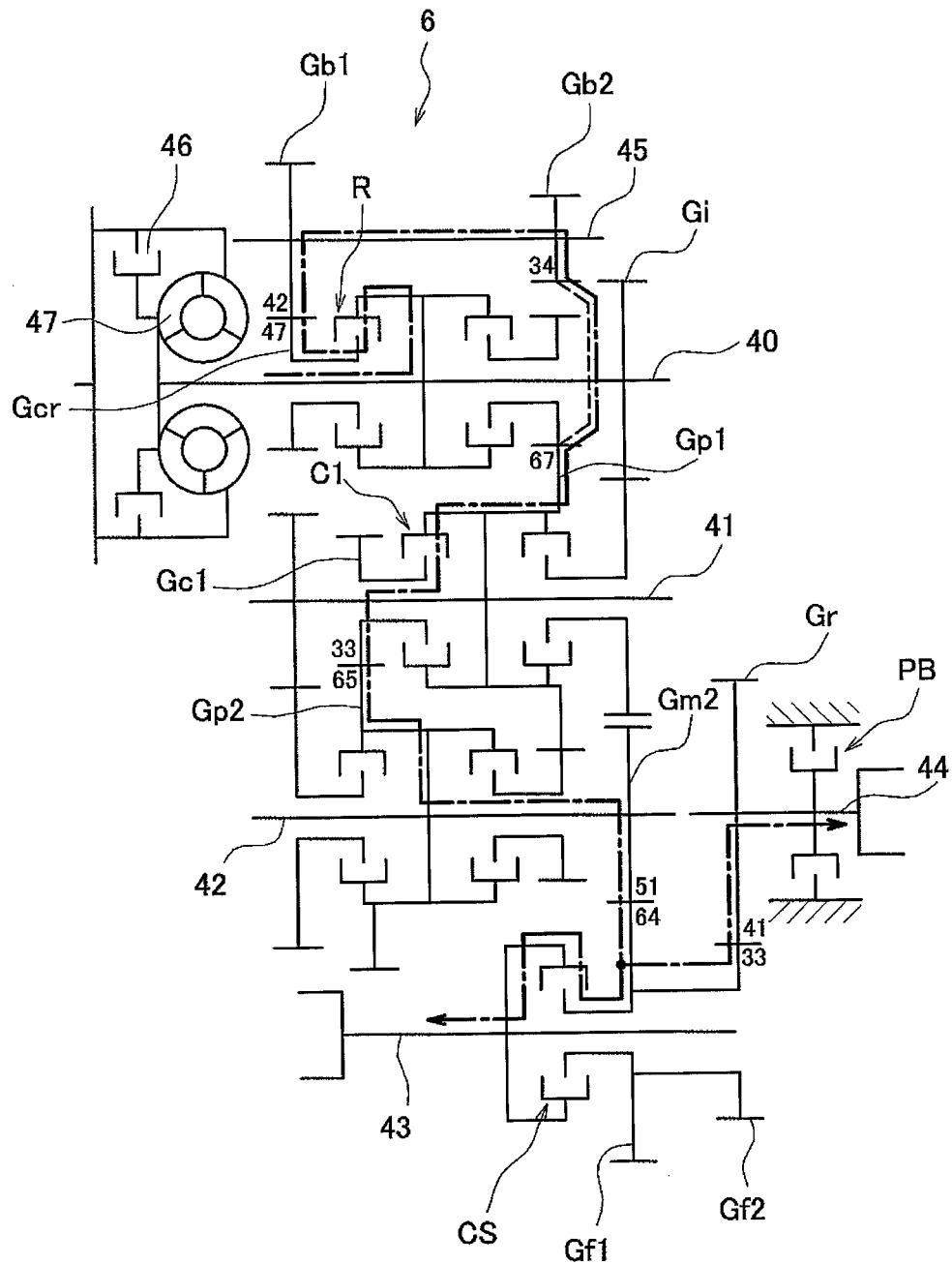
FIG. 9 is a diagram representing a power transmission path at a rearward travelling first speed stage.

In this case, as depicted with an arrow of a dashed dotted line in FIG. 9, power inputted into the input shaft 40 is transmitted to the front output shaft 43 and the rear output shaft 44 through the following path.

Input shaft 40→Rearward travelling clutch R→Rearward travelling clutch gear Gcr→Rearward travelling first gear Gb1→Reverse shaft 45→Rearward travelling second gear Gb2→First pack gear Gp1→First speed clutch C1→First speed clutch gear Gc1→Second pack gear Gp2→Second intermediate shaft 42→Second intermediate shaft gear Gm2→First front output shaft gear Gf1

As described below, power is transmitted while being divided at the first front output shaft gear Gf1 into the front wheel side and the rear wheel side.

Front wheel side: →Driving method switching clutch CS→Front output shaft 43
    Rear wheel side: →Second front output shaft gear Gf2→Rear output shaft gear Gr→Rear output shaft 44

Now, an exemplary gear teeth number of each gear in the power transmission path at the rearward travelling first speed stage will be described as follows.

Rearward travelling clutch gear Gcr/Rearward travelling first gear Gb1=47/42

Rearward travelling second gear Gb2/First pack gear Gp1=34/67

First speed clutch gear Gc1/Second pack gear Gp2=33/65

Second intermediate shaft gear Gm2/First front output shaft gear Gf1=51/64

Second front output shaft gear Gf2/Rear output shaft gear Gr=33/41

In this case, the front wheel side reduction ratio is calculated as follows.

$$(42\times67\times65\times64)/(47\times34\times33\times51)=4.353$$

The rear wheel side reduction ratio is calculated as follows.

$$(42\times67\times65\times64\times41)/(47\times34\times33\times51\times33)=5.408$$

Rearward Travelling Second Speed Stage

In the case of a rearward travelling second speed stage (R2), the rearward travelling clutch R and the second speed clutch C2 are turned on (transmission of power) while the other clutches are turned off (blockage of power).

Figure 10:
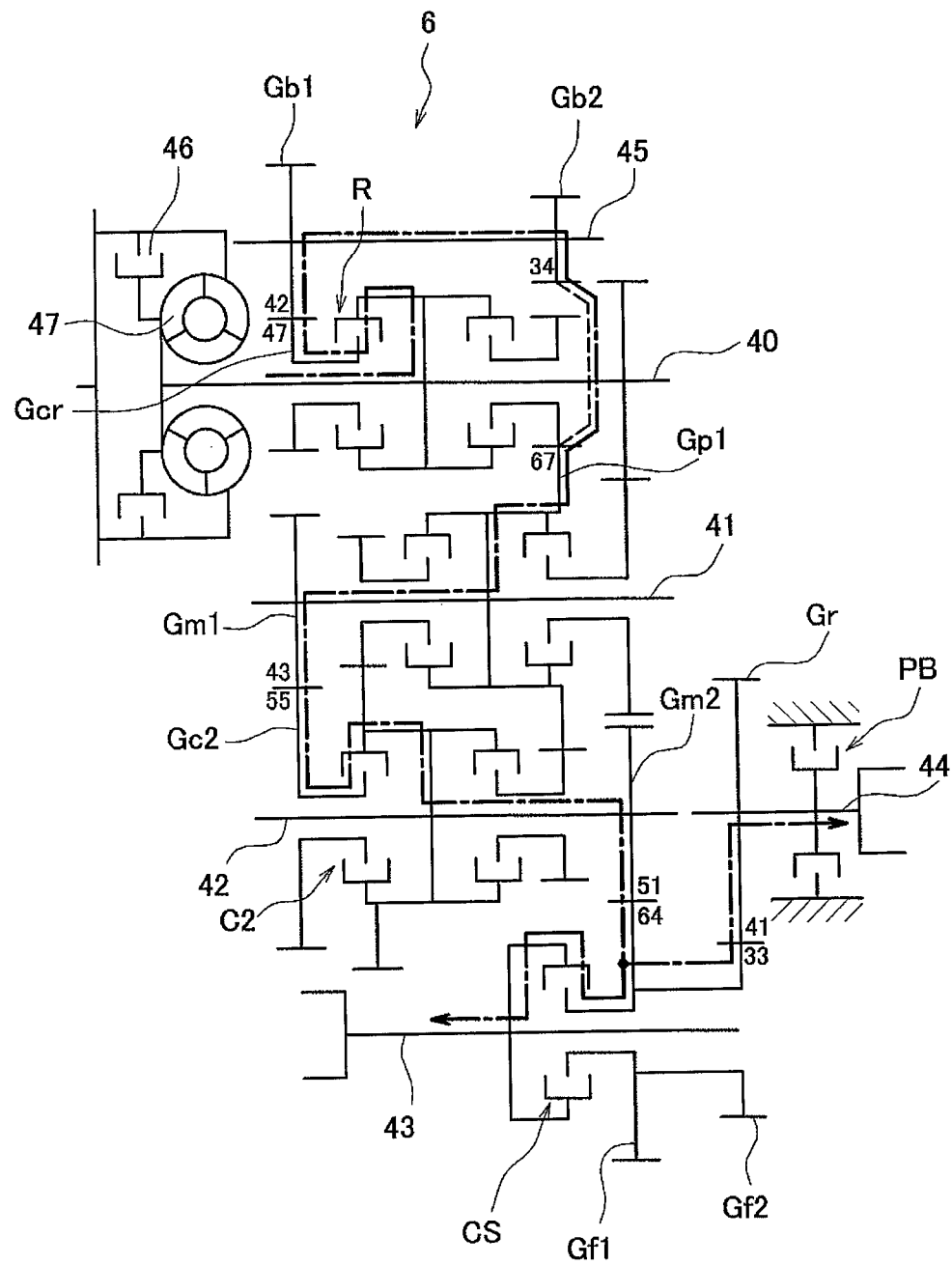
FIG. 10 is a diagram representing a power transmission path at a rearward travelling second speed stage.

In this case, as depicted with an arrow of a dashed dotted line in FIG. 10, power inputted into the input shaft 40 is transmitted to the front output shaft 43 and the rear output shaft 44 through the following path.

Input shaft 40→Rearward travelling clutch R→Rearward travelling clutch gear Gcr→Rearward travelling first gear Gb1→Reverse shaft 45→Rearward travelling second gear Gb2→First pack gear Gp1→First intermediate shaft 41→First intermediate shaft gear Gm1→Second speed clutch gear Gc2→Second speed clutch C2→Second intermediate shaft 42→Second intermediate shaft gear Gm2→First front output shaft gear Gf1

As described below, power is transmitted while being divided at the first front output shaft gear Gf1 into the front wheel side and the rear wheel side.

Front wheel side: →Driving method switching clutch CS→Front output shaft 43
    Rear wheel side: →Second front output shaft gear Gf2→Rear output shaft gear Gr→Rear output shaft 44

Now, an exemplary gear teeth number of each gear in the power transmission path at the rearward travelling second speed stage will be described as follows.

Rearward travelling clutch gear Gcr/Rearward travelling first gear Gb1=47/42

Rearward travelling second gear Gb2/First pack gear Gp1=34/67

First intermediate gear Gm1/Second speed clutch gear Gc2=43/55

Second intermediate shaft gear Gm2/First front output shaft gear Gf1=51/64

Second front output shaft gear Gf2/Rear output shaft gear Gr=33/41

In this case, the front wheel side reduction ratio is calculated as follows.

$$(42\times67\times55\times64)/(47\times34\times43\times51)=2.827$$

The rear wheel side reduction ratio is calculated as follows.

$$(42\times67\times55\times64\times41)/(47\times34\times43\times51\times33)=3.512$$

Rearward Travelling Third Speed Stage

In the case of a rearward travelling third speed stage (R3), the rearward travelling clutch R and the third speed clutch C3 are turned on while the other clutches are turned off.

Figure 11:
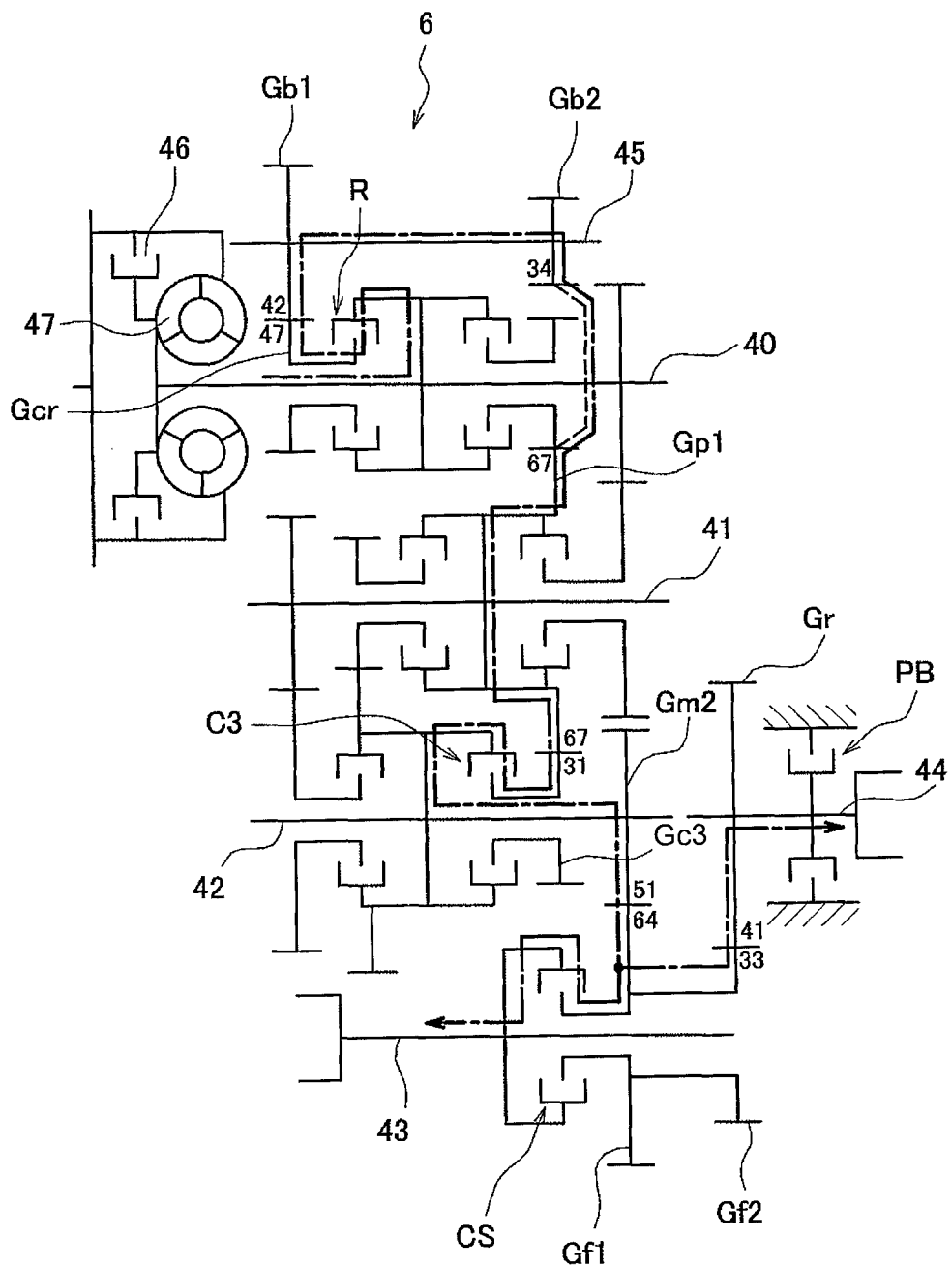
FIG. 11 is a diagram representing a power transmission path at a rearward travelling third speed stage.

In this case, as depicted with an arrow of a dashed dotted line in FIG. 11, power inputted into the input shaft 40 is transmitted to the front output shaft 43 and the rear output shaft 44 through the following path.

Input shaft 40→Rearward travelling clutch R→Rearward travelling clutch gear Gcr→Rearward travelling first gear Gb1→Reverse shaft 45→Rearward travelling second gear Gb2→First pack gear Gp1→Third speed clutch gear Gc3→Third speed clutch C3→Second intermediate shaft 42→Second intermediate shaft gear Gm2→First front output shaft gear Gf1

As described below, power is transmitted while being divided at the first front output shaft gear Gf1 into the front wheel side and the rear wheel side.

Front wheel side: →Driving method switching clutch CS→Front output shaft 43
Rear wheel side: →Second front output shaft gear Gf2→Rear output shaft gear Gr→Rear output shaft 44

Now, an exemplary gear teeth number of each gear in the power transmission path at the rearward travelling third speed stage will be described as follows.

Rearward travelling clutch gear Gcr/Rearward travelling first gear Gb1=47/42
Rearward travelling second gear Gb2/First pack gear Gp1=34/67
First pack gear Gp1/Third speed clutch gear Gc3=67/31
Second intermediate shaft gear Gm2/First front output shaft gear Gf1=51/64
Second front output shaft gear Gf1/Rear output shaft gear Gr=33/41

In this case, the front wheel side reduction ratio is calculated as follows.

(42×67×31×64)/(47×34×67×51)=1.022

The rear wheel side reduction ratio is calculated as follows.

(42×67×31×64×41)/(47×34×67×51×33)=1.270

Load Torque of Respective Shafts

In the aforementioned settings of the gear teeth numbers of the respective gears, the maximum load torque of each shaft is set as follows where the load torque of the input shaft 40 is set to be "1".
Input shaft 40—1
First intermediate shaft 41 (maximized at the forward travelling second speed stage): 1×67/38=1.76
Second intermediate shaft 42 (maximized at the forward travelling first speed stage): 1×(67×65)/(38×33)=3.47
Front output shaft 43 (maximized at the forward travelling first speed stage): (67×65×64)/(38×33×51)=4.358
Rear output shaft 44 (maximized at the forward travelling first speed stage): (67×65×64×41)/(38×33×51×33)=5.415

In the present exemplary embodiment, as is obvious from the above, where the torque of the input shaft 40 is set to be "1", the maximum torque of "5.415" can be obtained in the rear output shaft 44, and in addition, the maximum torque of the second intermediate shaft 42 will be "3.47". It should be noted that in conventional transmissions, the maximum torque, similarly to that acting on the rear output shaft, is supposed to act on the second intermediate shaft.

Features (1) The second intermediate shaft 42 and the rear output shaft 44 are separated away from each other as different shafts. Therefore, even when a large output torque is required in the rear output shaft 44, it is possible to reduce torque acting on the second intermediate shaft 42. Therefore, it is possible to reduce the diameter of the second intermediate shaft 42 and reduce the clutch capacity of the hydraulic clutch to be attached to the second intermediate shaft 42.

(2) Because of the reason similar to the above, it is not required to coaxially dispose the second intermediate shaft 42 and the rear output shaft 44. Therefore, the rear output shaft 44 can be disposed regardless of the position of the second intermediate shaft 42. Accordingly, when another member is attached to the case of the transmission, interference can be easily avoided between the member to be attached and the rear output shaft 44 and the arrangement of the rear output shaft 44 can be more flexibly designed.

(3) Rotation of the second intermediate shaft 42 is transmitted to the rear output shaft 44 by the gear mechanism formed by the four gears. Therefore, the second intermediate shaft 42 and the rear output shaft 44 can be coupled with a simple structure at a large reduction ratio.

(4) The rearward travelling clutch R and the forward travelling lower speed clutch FL, frequently used in the backhoe loader, are mounted on the input shaft 40 that a torque acting thereon is the smallest. Therefore, the capacities of these clutches can be reduced. Further, abrasion of these clutches can be inhibited.

Other Exemplary Embodiments

The present invention is not limited to the exemplary embodiment as described above and a variety of changes or modifications can be herein made without departing from the scope of the present invention.

The aforementioned exemplary embodiment has been explained by exemplifying the transmission that includes two intermediate shafts. However, the number of intermediate shafts is not limited. The present invention can be similarly applied to either a transmission including a single intermediate shaft or that including three or more intermediate shafts.

Further, the gear teeth numbers of the respective gears in the aforementioned exemplary embodiment are exemplary only and the present invention is not limited to the gear teeth numbers.

Yet further, the arrangements of the respective clutches are similarly not limited to those in the aforementioned exemplary embodiment.

In the backhoe loader of the illustrated embodiments, the diameter of an intermediate shaft can be reduced than that of a conventional one by reducing the load torque of the intermediate shaft. Further, it is possible to reduce the capacity of a clutch to be disposed on the intermediate shaft. Therefore, the entire weight of the transmission can be reduced and reduction in fuel consumption can be achieved.

The invention claimed is:
1. A backhoe loader comprising:
a front wheel;
a rear wheel having a diameter greater than a diameter of the front wheel; and
a multi-axis transmission configured to transmit power to the front wheel and the rear wheel, the multi-axis transmission including
an input shaft to which power is inputted,
a front output shaft coupled to the front wheel,
a rear output shaft coupled to the rear wheel, the rear output shaft being disposed in a position higher than a position of the front output shaft,
an intermediate shaft disposed between the input shaft and the front output shaft,
a first power transmission mechanism configured to transmit power from the input shaft to the intermediate shaft, and
a second power transmission mechanism configured to transmit power from the intermediate shaft to the front output shaft and the rear output shaft, the second power transmission mechanism including a first gear set including
an intermediate gear fixed to the intermediate shaft, and
a first front output shaft gear rotatably supported by the front output shaft, the first front output shaft gear being meshed with the intermediate gear,
a second gear set including
a second front output shaft gear rotatably supported by the front output shaft, the second front output shaft gear being fixed to the first front output shaft gear, and
a rear output shaft gear fixed to the rear output shaft, the rear output shaft gear being meshed with the second front output shaft gear, and
a driving method switching clutch disposed between the first and second front output shaft gears and the front output shaft, the driving method switching clutch being configured to allow and prevent transmission of power between the first and second front output shaft gears and the front output shaft,
the first gear set being configured to reduce a speed of rotation of the intermediate shaft and to transmit the speed-reduced rotation of the intermediate shaft towards the front output shaft, and
the second gear set being configured to reduce a seed of rotation of the intermediate shaft and to transmit the speed-reduced rotation of the intermediate shaft towards the rear output shaft, a reduction ratio of the second gear set being larger than a reduction ratio of the first gear set.

2. The backhoe loader recited in claim 1, wherein the rear output shaft is a separate shaft from the intermediate shaft.

3. The backhoe loader recited in claim 2, wherein the rear output shaft is arranged coaxially with respect to the intermediate shaft.

4. The backhoe loader recited in claim 2, wherein the rear output shaft is arranged non-coaxially with respect to the intermediate shaft.

5. The backhoe loader recited in claim 1, further comprising at least a gear shifting clutch disposed on the intermediate shaft.

6. The backhoe loader recited in claim 1, further comprising a forward/rearward travelling switching clutch disposed on the input shaft.

* * * * *